W. H. LAUBACH.
VELOCIPEDE.
No. 86,235. Patented Jan. 26, 1869.
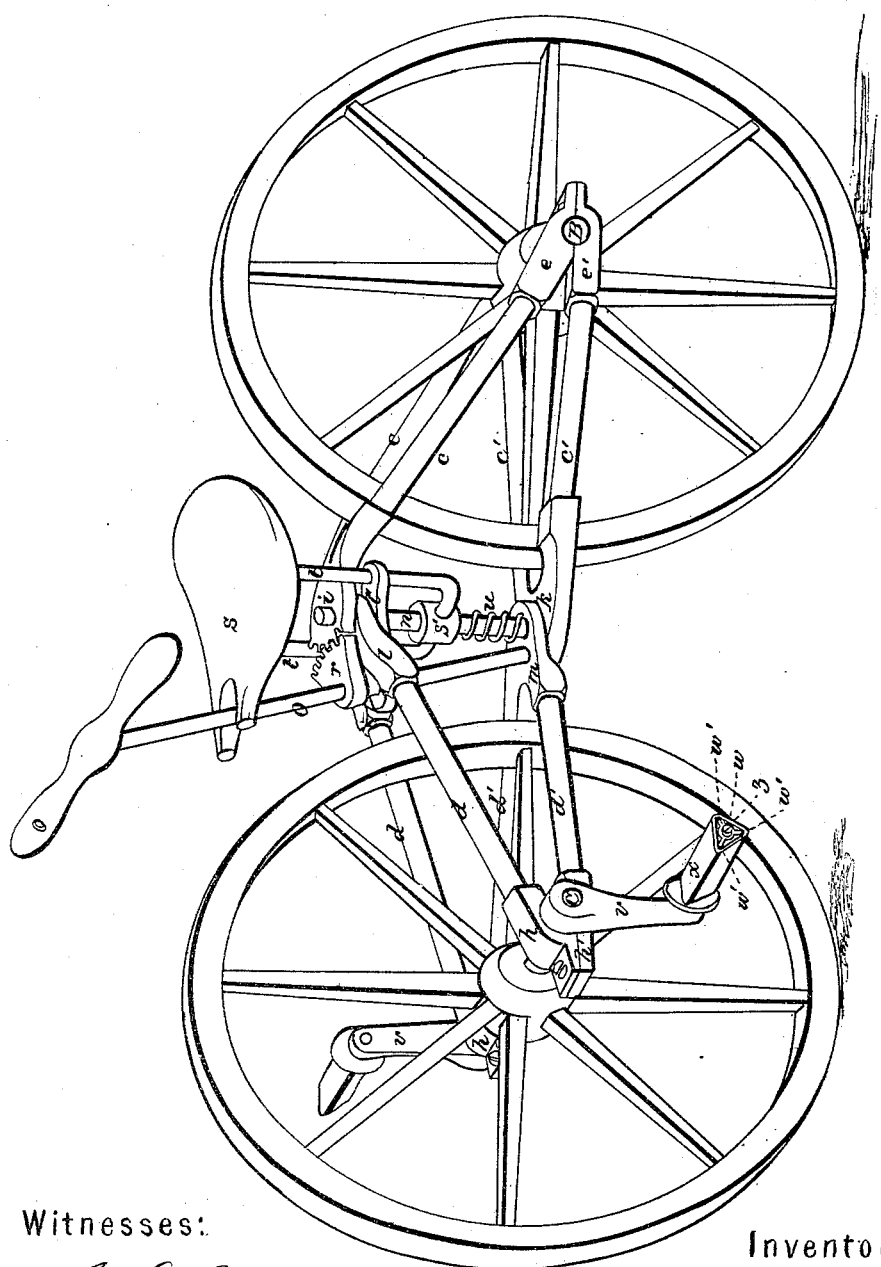
Witnesses:
Geo. E. Brown
C. O. Brown.
Inventor:
W. H. Laubach

W. H. LAUBACH, OF PHILADELPHIA, PENNSYLVANIA.

Letters Patent No. 86,235, dated January 26, 1869.

IMPROVEMENT IN VELOCIPEDES.

The Schedule referred to in these Letters Patent and making part of the same.

*To all whom it may concern:*

Be it known that I, W. H. LAUBACH, of Philadelphia, in the State of Pennsylvania have invented a new and useful Improvement in Velocipedes; and I do hereby declare that the following is a full, clear, and exact description of the same, reference being had to the accompanying drawings, and letters of reference marked thereon, making a part of this specification, in which—

Figure 1 is a perspective view.

To enable those skilled in the art to make and use my invention, I now proceed to describe its construction and operation.

Similar letters in the drawings refer to like parts.

This invention consists in making the frame of a velocipede in two parts, whereof one embraces the front wheel, and the other, the rear wheel, which two parts are pivoted together, between the forward and rear wheels, in such manner that both wheels shall always be upon the same arc, whenever the machine may be run upon a curve, and also in such manner that the weight of the occupant of the carriage shall always have a tendency, by the exercise of mechanical force, and without any exertion on his own part, to keep the two portions in a straight line.

In the drawing—

A represents the frame of a bicycle, or two-wheeled velocipede, the said frame being divided into two parts, whereof one part is supported, at its front end, upon the forward axle, C, and the other part is supported, at its rear end, upon the hinder axle, B.

Both parts are made bifurcated, so as to embrace the wheels, and each side of each part is also bifurcated, so that each longitudinal half of the frame forms a truss, the beams, *c c, c′ c′, d d, d′ d′*, of which are sections of gas-pipe, or solid rod, forged or cast in one piece, said beams being screwed, or otherwise attached, at the rear end of the frame, to sockets *e e* and *e′ e′*, which sockets form the boxes for the axle B, and, at the forward end of the frame, into the sockets *h h, h′ h′*, which sockets form the boxes for the axle C.

The ends of the beams, which converge at centre, are screwed, or otherwise attached, to sockets *i k l m*, of which sockets *i* and *l* are pivoted together, and also *k* and *m*, the vertical rod *n* serving as the pivot for all four.

This method of construction secures at once lightness, strength, and rigidity, the heaviest velocipede of this kind, I make, weighing not more than fifty pounds, with wheels three feet in diameter, and the frame being perfectly stiff.

The peculiarity of my invention, which I consider of greatest importance, is the pivoting of the two parts of the frame together at a point between the wheels.

This construction may be described, in other words, as a pivoting of the two wheels together upon one vertical axle, the result of which is that, whenever the carriage travels in a curve, both wheels run in the same arc, the rear wheel following exactly in the track of the forward one.

In all other two-wheeled velocipedes, the front wheel is controlled by the common bifurcated, vertical shaft, and the rear wheel does not change direction at all. As a consequence, whenever the front wheel is deflected out of the line of travel of the rear wheel, the former is subject to a lateral thrust from the latter, tending to wrench and injure it, and the power which has to be expended in overcoming such lateral thrust is a loss.

My method, it is obvious, remedies this difficulty, all the power put forth in moving my machine being expended in imparting a direct forward motion to each wheel.

In other bicycle-velocipedes, when pressure is applied to one of the treadles, in order to prevent the front wheel from being deflected out of line with the rear wheel, a resisting-force has to be exerted upon the handle.

One property of the truss-system above described is that the weight of the sitter tends to keep the two halves of the frame in a straight line; and so powerful is this tendency, that no amount of pressure exerted upon either of my treadles, will suffice to deflect the front wheel out of line with the rear, and no force can do this except it be applied to the handle *o′*, and exerted through the mechanism hereinafter described.

My steering-apparatus consists of a shaft, *o*, stepped in the socket *m*, running up through the socket *l*, provided with a handle, *o′*, at its top, and furnished with a rack, *r*, which engages with another rack, formed on the front part of the socket *i*.

By turning the handle *o′*, the front half of the machine is moved, in either direction, through the agency of the shaft *o* and racks *i* and *r*.

The seat *s* is supported by means of a socket, *s′*, placed upon the shaft *n*, from which socket two arms, *t t*, project upward, one on each side, and pass through wings, *l′ l′*, of the socket *l*.

On the top of the arms *t* the seat is fixed.

Beneath the socket *s′*, and around the shaft *n*, is placed a spiral spring, *u*.

The seat, being connected, by means of the arms *t* and wings *l′*, with the forward part of the frame, turns with it, so that the forward wheel is never brought against either of the legs of the sitter, as is the fact in all other bicycles.

The treadles are placed upon cranks *v v*, placed, one on each end of the axle C.

The treadles are constructed in a peculiar manner.

A box, *w*, is placed upon each spindle, touching the spindle at only two points.

The box is furnished with three wings, *w′*, extending lengthwise of it.

Outside the wings is placed an India-rubber tube, *x*, stretched tightly over them, which forms a triangular prism, each face furnishing a foothold, to which the foot naturally adheres, and from which it may be, without difficulty, removed.

If the treadle swivels on the spindle, it readily assumes the proper position, whenever the foot is placed upon it.

I may use either one or two wheels at the rear, without changing the frame.

What I claim as new, and desire to secure by Letters Patent, is—

1. Constructing a velocipede-frame in two parts, and pivoting the two parts together at that point of the frame which is between the front and rear wheels, substantially as and for the purpose specified.

2. The perpendicular-sliding adjustable seat.

W. H. LAUBACH.

Witnesses:
C. O. BROWN,
S. M. POOL.